Nov. 19, 1929.  J. NELSON  1,736,663
AUTOMATIC TRANSMISSION MECHANISM
Filed March 14, 1929   2 Sheets-Sheet 1
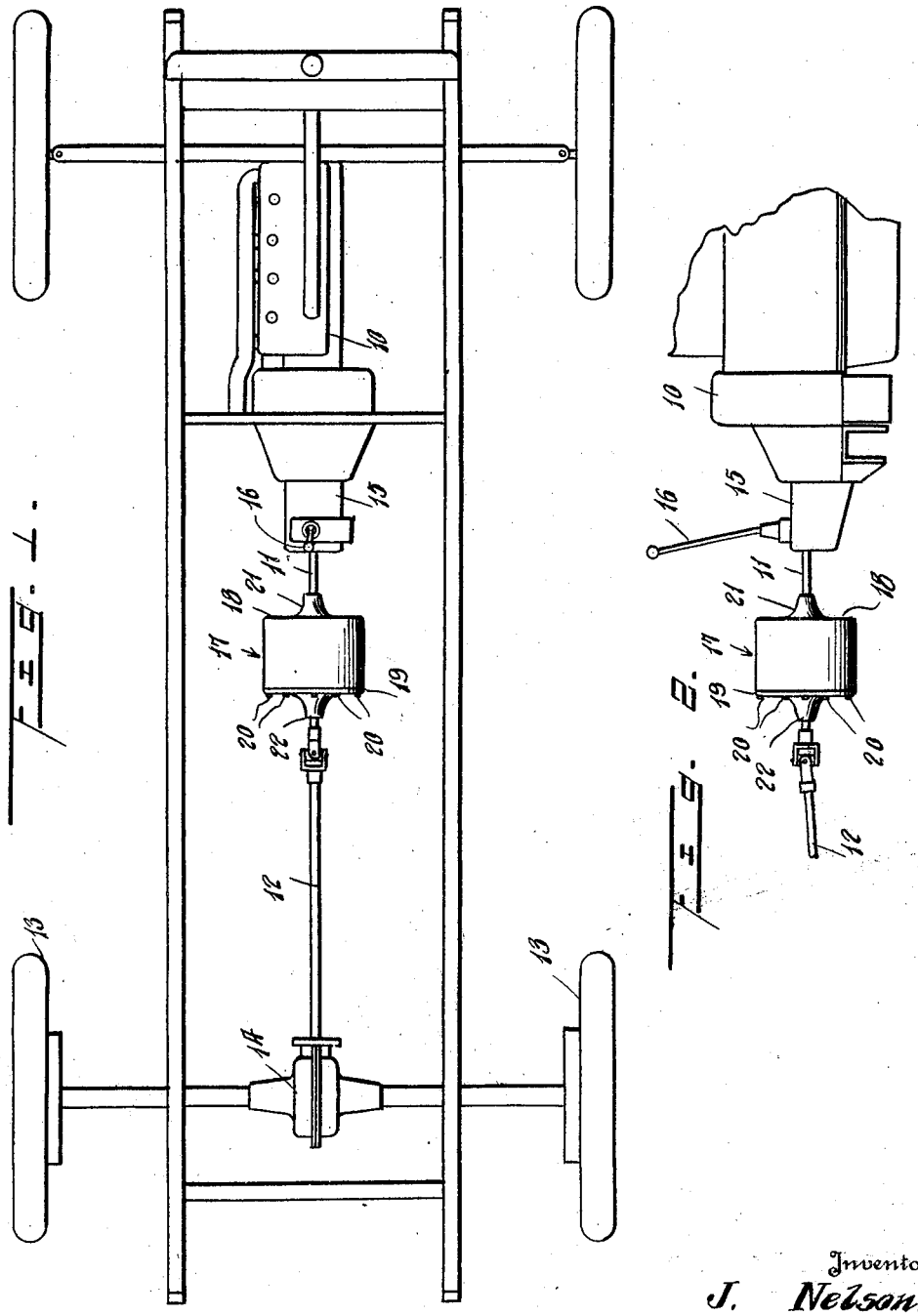
Inventor
J. Nelson.

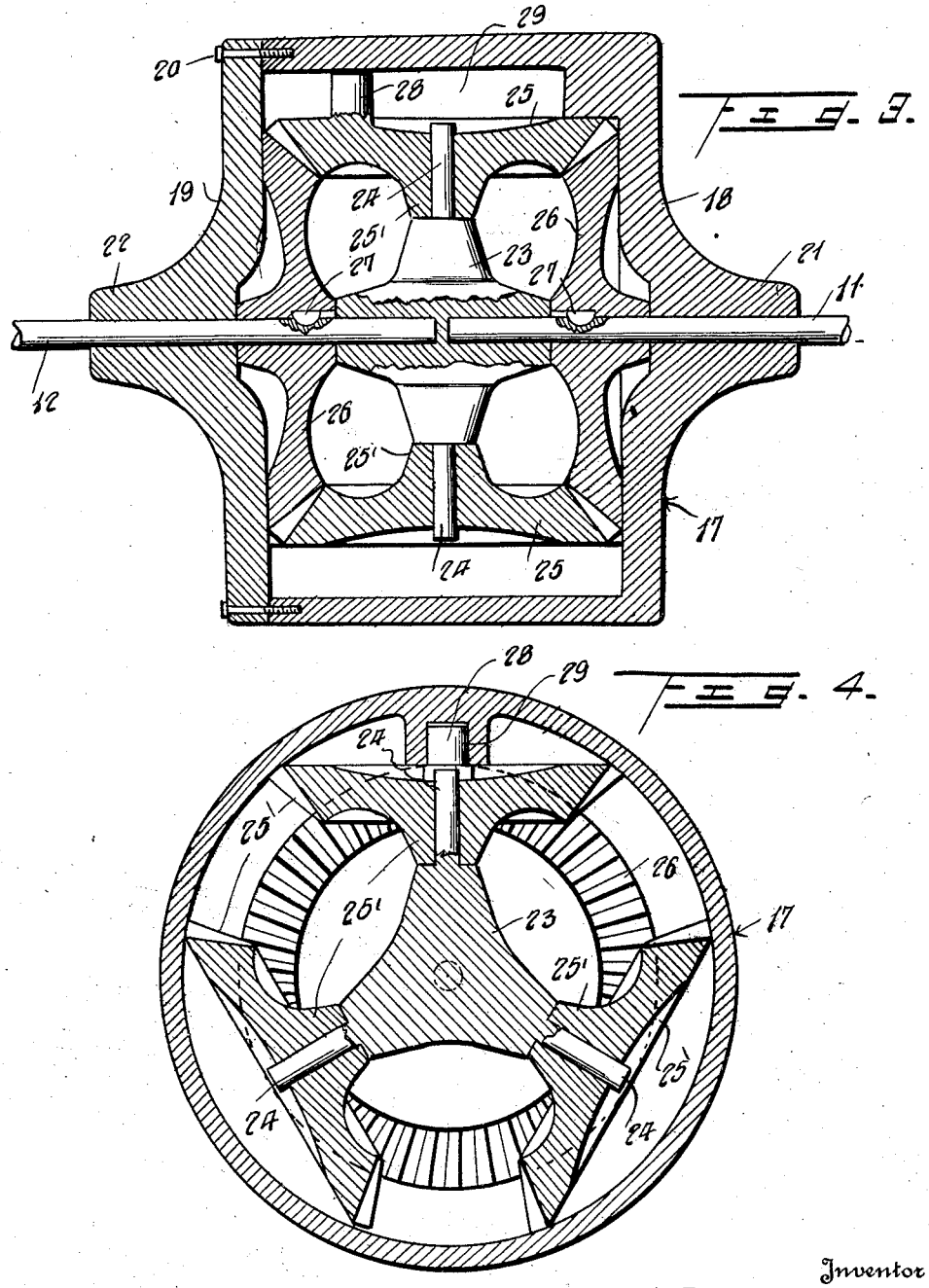

Patented Nov. 19, 1929

1,736,663

UNITED STATES PATENT OFFICE

JOHN NELSON, OF ERICSON, NEBRASKA

AUTOMATIC TRANSMISSION MECHANISM

Application filed March 14, 1929. Serial No. 347,019.

This invention relates to an automatic transmission mechanism for automobiles or machinery in general.

It is aimed to provide a novel mechanism which will dispense with the necessity of manually shifting gears in automobiles, other self-propelled vehicles or machinery generally, the transmission automatically adjusting itself according to the load, possible speed or inclination of the roadway.

A particular object is to provide a novel construction having geared engine and driven shafts and a coacting spider and balance wheel journaled thereon and an interconnection between one of the gears and said balance wheel whereby the balance wheel will be rocked.

Additional objects and advantages will in part be pointed out and otherwise will become apparent from a consideration of the description following taken in connection with accompanying drawings illustrating an operative embodiment.

In said drawings:—

Figure 1 is a plan view illustrating my improvements applied to an automobile, the chassis of the latter only being shown, Figure 2 is a side elevation of my improvements in connection with the motor of said automobile, Figure 3 is a central vertical sectional view through the transmission constituting my invention, and Figure 4 is a transverse sectional view through such transmission of a slightly modified form.

Referring specifically to the drawings, the invention is shown in connection with a conventional automobile of which 10 is the propelling engine and 11 and 12 are the propelling shafts, being drive and driven sections respectively, the latter driving the rear wheels 13 through conventional differential mechanism at 14.

In a casing 15, corresponding to the usual transmission case, clutch and reverse gear mechanism is rotated (not being shown) controlled by a shifting lever as at 16.

The transmission constituting my invention consists of a balance wheel 17 formed of a main section 18 and an end section 19, the two being detachably connected together as by bolts at 20. Such sections respectively have hubs 21 and 22 in which adjacent ends of the drive and driven shaft sections 11 and 12 are journaled, the balance wheel thus being free to rotate or turn on the axis of said sections 11 and 12. Centrally disposed within the balance wheel 17 is a spider 23 and the ends of the shaft sections 11 and 12 are also loosely journaled in said spider. Said spider has radial stub shafts 24 on which bevel gear wheels 25 are journaled. Such bevel gear wheels 25 are arranged in mesh with bevel gear wheels 26 keyed as at 27 to the shaft sections 11 and 12. One of the bevel gear wheels 25 has a lug 28 disposed for travel in an elongated slot 29 provided in the annular wall of balance wheel section 18.

Presuming the automobile to be equipped with the improved automatic transmission herein disclosed, with the motor 10 started and the clutch thereof "engaged", the energy of the motor through shaft section 11 and gear 26 keyed to section 11 and gear 25, will rock balance wheel 17 back and forth due to the provision of the pin 28 and slot 29. At the same time, the balance wheel 17 is revolving at the motor speed so that it is acting as a fly wheel or a balance wheel and is resisting the motor. Increasing the motor speed will increase the resistance of balance wheel 17 when the energy of the motor reaches gear 26 keyed to shaft section 12 to thus act on the differential and rear wheel and hence the car will move forward. On good level roads, the gears in the transmission or balance wheel 17 will be stationary or substantially so. On an up grade, the motor will not slow down but through the action of the balance wheel, the gears will automatically move to positions corresponding to intermediate or low or extra low until the top of the hill is reached. If some means is provided to hold the shaft section 11 stationary, the transmission will do the braking for the automobile and the steeper the hill, the more resistance it will offer.

Various changes may be resorted to provided they fall within the spirit and scope of the invention. For instance, in the modified form of Figure 4, the spider corresponding to 23 is designated 23′ and instead of employing two of the gear wheels 25, it employs three of them, the same being designated 25′, the balance of the structure being similar to the preceding form and the same reference characters therefore being applied thereto.

I claim as my invention:—

1. An automatic transmission comprising a balance wheel, a driving and a driven shaft section on which the balance wheel is journaled, gears keyed to said shafts within the balance wheel, and intermediate gearing between said gears, and a connection between the intermediate gearing and balance wheel to cause rocking thereof.

2. An automatic transmission comprising a balance wheel, a driving and a driven shaft section on which the balance wheel is journaled, gears keyed to said shafts within the balance wheel, and intermediate gearing between said gears, a connection between the intermediate gearing and balance wheel to cause rocking thereof consisting of gear wheels, means journaled on said shaft sections and mounting the latter gear wheels, one of the latter gear wheels having a lug, and the balance wheel having a slot in which said lug is movable.

3. An automatic transmission comprising a driving and a driven shaft section, a balance wheel journaled on said sections, gear wheels keyed to said sections within the balance wheel, a spider between the gear wheels journaled on said sections, gear wheels journaled on the spider and in mesh with the first mentioned gear wheels, a lug on one of the second mentioned gear wheels, and said balance wheel having a slot engaged by said lug whereby operation will cause the balance wheel to rock.

4. An automatic transmission comprising a driving and a driven shaft section, a balance wheel journaled on said sections, gear wheels keyed to said sections within the balance wheel, a spider between the gear wheels journaled on said sections, gear wheels journaled on the spider and in mesh with the first mentioned gear wheels, a lug on one of the second mentioned gear wheels, said balance wheel having a slot engaged by said lug whereby operation will cause the balance wheel to rock, said spider having stub shafts on which the second mentioned gear wheels are directly journaled, said balance wheel being provided in sections separably connected together, one of said sections having an annular wall on the interior of which said slot is provided.

In testimony whereof I affix my signature.

JOHN NELSON.